United States Patent
Schwarz et al.

(10) Patent No.: US 6,947,247 B2
(45) Date of Patent: Sep. 20, 2005

(54) LARGE ANGLE AZIMUTH RECORDING AND HEAD CONFIGURATIONS

(75) Inventors: Theodore A. Schwarz, St. Paul, MN (US); Matthew P. Dugas, St. Paul, MN (US)

(73) Assignee: Advanced Research Corporation, Minneapolis, MN (US)

(*) Notice: Subject to any disclaimer, the term of this patent is extended or adjusted under 35 U.S.C. 154(b) by 0 days.

(21) Appl. No.: 10/793,502

(22) Filed: Mar. 4, 2004

(65) Prior Publication Data

US 2004/0174628 A1 Sep. 9, 2004

Related U.S. Application Data

(60) Provisional application No. 60/469,521, filed on May 9, 2003, provisional application No. 60/469,518, filed on May 9, 2003, and provisional application No. 60/452,206, filed on Mar. 5, 2003.

(51) Int. Cl.$^7$ .............................. G11B 20/20; G11B 5/00
(52) U.S. Cl. ........................................ 360/76; 360/77.12
(58) Field of Search ....................... 360/121, 76, 77.13, 360/21, 75, 78, 69, 70, 71, 77.12

(56) References Cited

U.S. PATENT DOCUMENTS

| | | | |
|---|---|---|---|
| 2,938,962 A | 5/1960 | Konins et al. | |
| 4,268,881 A | 5/1981 | Saito | |
| 4,318,146 A | 3/1982 | Ike et al. | |
| 4,539,615 A | * 9/1985 | Arai et al. ................. | 360/121 |
| 4,609,959 A | 9/1986 | Rudi | |
| 4,758,907 A | 7/1988 | Okamoto et al. | |
| 4,897,748 A | 1/1990 | Takahashi et al. | |
| 4,971,947 A | 11/1990 | Barnes et al. | |
| 5,017,326 A | 5/1991 | Wash et al. | |
| 5,132,861 A | 7/1992 | Behr et al. | |
| 5,196,969 A | 3/1993 | Iwamatsu et al. | |
| 5,241,442 A | 8/1993 | Akashi | |
| 5,262,908 A | 11/1993 | Iwamatsu et al. | |
| 5,280,402 A | 1/1994 | Anderson et al. | |
| 5,293,281 A | 3/1994 | Behr et al. | |
| 5,307,217 A | 4/1994 | Saliba | |
| 5,371,638 A | * 12/1994 | Saliba ..................... | 360/77.12 |
| 5,379,170 A | 1/1995 | Schwarz | |
| 5,434,732 A | 7/1995 | Schwarz et al. | |
| 5,450,257 A | 9/1995 | Tran et al. | |
| 5,452,152 A | 9/1995 | Rudi | |
| 5,523,904 A | * 6/1996 | Saliba ..................... | 360/77.12 |
| 5,552,944 A | 9/1996 | Clemow | |
| 5,629,813 A | 5/1997 | Baca et al. | |
| 5,680,278 A | 10/1997 | Sawtelle, Jr. | |
| 5,689,384 A | 11/1997 | Albrecht et al. | |
| 5,710,673 A | 1/1998 | Varian | |
| 5,757,575 A | 5/1998 | Hallamasek et al. | |
| 5,867,339 A | 2/1999 | Panish et al. | |
| 5,940,238 A | 8/1999 | Nayak et al. | |
| 5,973,874 A | 10/1999 | Panish et al. | |
| 5,982,711 A | 11/1999 | Knowles et al. | |
| 6,075,678 A | 6/2000 | Saliba | |
| 6,088,184 A | * 7/2000 | Hu ............................. | 360/76 |
| 6,130,804 A | 10/2000 | Panish et al. | |
| 6,141,174 A | 10/2000 | Judge et al. | |
| 6,163,421 A | 12/2000 | Shinpuku et al. | |
| 6,222,698 B1 | * 4/2001 | Barndt et al. ................. | 360/76 |
| 6,275,350 B1 | 8/2001 | Barndt et al. | |
| 6,307,718 B1 | 10/2001 | Kasetty | |
| 6,469,867 B2 | * 10/2002 | Saliba ........................ | 360/122 |
| 6,545,837 B1 | 4/2003 | Tran | |
| 2003/0048563 A1 | 3/2003 | Magnusson et al. | |

FOREIGN PATENT DOCUMENTS

| | | | | |
|---|---|---|---|---|
| JP | 58146011 A | * | 8/1983 | ............ G11B/5/04 |

* cited by examiner

*Primary Examiner*—David Hudspeth
*Assistant Examiner*—Jason Olson
(74) *Attorney, Agent, or Firm*—Kagan Binder, PLLC

(57) ABSTRACT

Large angle azimuth recording methods and devices. In one aspect of the invention methods of recording one or data tracks having data transitions oriented at a large azimuth angle are provided. In another aspect of the invention methods of reading a data track having data transitions oriented at a large azimuth angle are provided. Such methods include steps of suppressing a side track signal. In other aspects of the invention, head modules and devices for writing and/or reading large azimuth angle data tracks are provided.

27 Claims, 8 Drawing Sheets

LARGE ANGLE AZIMUTH RECORDING AND HEAD CONFIGURATIONS

PRIORITY CLAIM

This patent application claims priority under 35 U.S.C. §119(e) from U.S. Provisional Patent Application No. 60/469,521, filed on May 9, 2003, by Dugas et al., U.S. Provisional Patent Application No. 60/469,518, filed on May 9, 2003, by Dugas et al., and U.S. Provisional Patent Application No. 60/452,206, filed on Mar. 5, 2003, by Dugas et al., each of which application is commonly owned by the assignee of the present application and the entire contents of which are incorporated herein by reference.

FIELD OF THE INVENTION

The present invention relates generally to magnetic storage recording techniques and devices. In particular, the present invention relates to large angle azimuthal recording for linear serpentine tape systems and head configurations for use in such recording for achieving high recording densities.

BACKGROUND OF THE INVENTION

Various magnetic recording techniques exist for recording data to and from magnetic storage media, such as magnetic tape. Magnetic tapes are used for data storage in computer systems requiring data removability, low-cost data storage, high data-rate capability, and high volumetric efficiency and reusability. The rapidly accelerating growth in stored digital data and images, the Internet, and replacement of paper as long-term record retention, and the need for massive dense storage for reconnaissance and surveillance is creating a demand for corresponding increases in the data storage capacities of magnetic tape recording and reproducing systems, while maintaining the special requirements of high speed digital tape systems.

Tape recording and reproducing systems for use as computer data storage devices are often required to provide high data transfer rates and to perform a read check on all written data. To satisfy these requirements, conventional or orthogonal linear tape systems (where recorded transition lines that are created between regions of opposite magnetization are orthogonal to the head/tape motion direction) typically employ methods wherein the tracks of data lie parallel to each other and to the edge of the tape. Linear recording techniques offer high data transfer rates by employing reading and writing head configurations with multiple parallel channels, wherein each read and write head pair provides a channel with each writing or reading element in data transfer contact with the recording media 100% of the time.

In orthogonal linear tape recording systems, data tracks are followed in the direction of tape movement with the read and write heads arranged in the same manner as the recorded transitions that are perpendicular to the direction of tape motion. The write head defines the width of a data track (and thus the number of data tracks that can be provided across a tape of given width) by creating the regions or domains of magnetization following one another in the tape direction at the width of the write head. The potential for misregistration of the read element to the written track (from tape wander, data track alignment or the like) requires that the read head be substantially smaller than the written track width in order to ensure that the read head is reading magnetization fields only within the desired data track. Thus, the read head size (as is also limited by read head performance characteristics) limits how narrow the data track can be, hence the maximum track density. That is, not only is the data track width limited by the minimum read head size in order to meet the recording system's performance criterion, it must be sufficiently wider to accommodate expected misregistration as may occur under the dynamic conditions of moving media and as may be determined empirically or by modeling. If a read head moves off the data track for whatever reason and begins to read a signal from the adjacent track, the possibility of erroneous data transfer increases. More specifically, the error rate is known to increase exponentially as the read head moves further off the data track. Typically, for an acceptable off-track error rate, the adjacent track signal must be less than ten percent of the data track signal. The general premise is thus to write wide and read narrow. Writing wide, however, decreases the data density (less data tracks across a given tape width). Reading narrow is unfortunately limited by making an acceptable read head that will still meet signal amplitude, SNR, and media defect sensitivity requirements. As a result, minimum track width is approximately the width of a read element that meets the above performance requirements plus twice the misregistration (normally the three sigma value since the misregistration is a statistical distribution).

There are a number of potential sources of read element to written track misregistration error, which error is systematic in that both the media and the drive are involved as potential sources of error. The principal sources of error are: tape lateral motion, vibration in the head/actuator assembly, dimensional instability of the media substrate, and mechanical misalignments between read and write elements in manufacturing and assembly. Probably the most significant limitation on tape track densities is the tendency for the tape to experience lateral tape motion, which is a tendency for the tape to shift laterally relative to the linear direction of tape motion. During a data track write, lateral tape motion can cause one or more data tracks to deviate from a desired axis along which tracks are expected to be written. During reading, lateral tape motion can cause misregistration of the read head over the track being read. This build-up of potential misregistration of data tracks combined with other less significant potential sources of misregistration can result in a portion of the read element to be positioned over an adjacent data track, which, if significant enough, can cause an unacceptable level of data transfer errors. As noted above, the reading of an adjacent track is typically limited to ten percent or less of the desired data track signal. The normal method in linear tape recording to ameliorate the potential effects of this misregistration is to make the read element much narrower, i.e., approximately half, than the track width. However, as noted above, limitations of minimum signal amplitude, signal-to-noise-ratio, and sensitivity to media defects provides a lower limit as to how narrow the read element can actually be. Thus, from a practical design stand point, an effective read head size as determined by such performance constraints would be doubled to determine a desirable data track width. As such, the effective read head size limits how narrow a data track can be made.

One developed method of increasing track density involves azimuth recording techniques. Azimuth recording has long been used in helical recording systems and has been more recently introduced into linear tape systems. Generally, in azimuth recording of either helical or linear tape systems, data transitions on alternate adjacent tracks are recorded at a same but opposite angle relative to an axis along which the head travels relative to the media. In helical tape recording systems, the head is moved relative to a linear tape movement at a significantly greater speed and at an angle to the direction of tape movement.

Azimuth recording itself is a well-understood technology that provides a level of suppression of an adjacent track signal. The suppression is based upon the well known relationship that the suppression, $S=20*\log_{10}[\sin x/x]$, where $x=(\pi W/\lambda)*\tan 2\theta$. In this relationship W is the data track width, $\theta$ is the angle that the recorded transitions make with the transverse axis to the head direction, and $\lambda$ is the wavelength associated with the minimum transition density ($\lambda$=two times the maximum transition spacing). Thus, a determined azimuth angle, $\theta$, is dependent on: the degree of suppression to be attained, the data track width W, and the minimum transition density or maximum $\lambda$ of the readback signal spectra. In current systems the data track width W is at least an order of magnitude larger than $\lambda$ and thus, a suitable transition angle $\theta$ can be relatively small to achieve sufficient suppression of an adjacent data track signal.

Because of such angular azimuth recording, a signal from a track adjacent to the data track being read can be sufficiently suppressed to an acceptable level, such as to be less than ten percent of the data track signal as noted above. Hence, a read element can overextend an adjacent track and thus can be designed to be wider than the data track, allowing the full data track signal to be utilized.

In FIG. 1, a section of magnetic tape 10 that includes data recorded by an azimuth recording technique is schematically illustrated. Three adjacent data tracks, 12, 14, and 16, that have track widths 13, 15, and 17 respectively, are schematically illustrated. The data tracks 12, 14, and 16 each include a plurality of data transitions, 18, 20, and 22, respectively, that are spaced apart from each other within each individual track to define a transition density (number of data transitions per unit length of track). The data transitions are provided and can be counted along a direction of travel 24 of the tape 10 that also includes a transverse axis 26 (an axis perpendicular to the travel direction of the tape). As illustrated, the data transitions (indicated by the lines that would be created between adjacent fields of opposite magnetization) are provided at an angle $\theta$ with respect to the transverse axis 26 and they are provided so that adjacent data transitions of adjacent tracks are provided at an angle to each other $2\theta$.

A read head 28 is shown positioned above the data track 14 and can be used for reading the data transitions 20 of the data track 14. As shown, the head 28 extends across the track 14 and also extends partially over adjacent tracks 12 and 16. Thus, when reading the data transitions 20, the head 28 will also read a portion of the signals from adjacent tracks 12 and 16. Because the data transitions 18 and 22 of the tracks 12 and 16, respectively, are provided at an angle to the data transitions of the track 14, the signal read from the adjacent tracks 12 and 16 can be at least partially suppressed based upon the relationship of suppression to track width W, wavelength $\lambda$, and transition angle $\theta$ identified above. From the sin x/x relationship of the equation above, an expression x at 90° would achieve the greatest suppression. The expression x, however, is determined in part by the relationship of the tangent of $2\theta$ (two times the transition angle $\theta$). Whereas the tangent approaches infinity as $2\theta$ is increased to 90° and a greater value of tan $2\theta$ increases the value of X, the suppression of an adjacent track signal would increase to a transition angle $\theta$ limit of 45 degrees. However, acceptable levels of suppression are attained in current azimuth recording systems at transition angles well below the maximum of 45 degrees. Importantly, there is also a well accepted design factor to achieve greater overall recording density (looking at tape surface area) that works against a desire to increase the transition angle $\theta$ at all, thus limiting a designer to not increase the transition angle $\theta$ beyond that which is necessary to effectively achieve an acceptable suppression of an adjacent track signal. That is, it has been determined that as the azimuth angle increases, the increase in the suppression per unit of angle increase diminishes and the minimum separation between transitions in the direction normal to the azimuth angle decreases resulting in the number of transitions per unit length of track decreasing by approximately cosine $\theta$. Thus, under the current approach to azimuth recording, it is accepted that it is only desirable to increase the azimuth angle to achieve the desired suppression level in order to minimize the "cosine loss" as described in U.S. Pat. No. 4,539,615, "Azimuthal Magnetic Recording and Reproducing Apparatus." The result is that for an acceptable level of suppression taken as a given along with track width and transition spacing, any further increase of the azimuth angle would result in a lowered overall recording density. Thus, current azimuth recording techniques limit azimuth angles of such transitions to less than about 20 degrees.

Current linear serpentine tape drives for azimuth recording typically utilize a single head structure that contains two pairs of read and write elements. Like orthogonal head structures, azimuthal head structures are typically designed with the read and write elements parallel to each other and aligned in the direction of tape movement. As such, the head is rotated to bring the appropriate read/write pair into proper alignment at the desired azimuth angle. One limitation of using a single head is that two degrees of freedom of movement, e.g. rotation and transverse shifting of the head, are required for track accessing and track following. The mechanical joining of the read and write elements makes it difficult to achieve independent tracking of the read and write elements without such multiple freedoms of movement.

By offsetting the read and write elements as they are positioned along lines that are parallel to one another as to the distance along the parallel lines, an orthogonally constructed head can be positioned to record and read azimuthal tracks when rotated at an appropriate angle. The read and write elements can be aligned so that with the proper spatial relationship between them, they are able to read and write adjacent tracks and only require transversal repositioning once for every track pair. Such transversal movement and positioning or tracking can be conventionally controlled by known actuators. Tracking can be achieved in a single head, but usually requires the additional complexity and weight of a dual degree freedom actuator, such as conventionally known and that permits both rotary movement of the single head and movement of the head in the transverse direction to the tape movement. A compound dual degree freedom of motion actuator, i.e. a single unit to provide multiple types of motion, adds additional mass and generally needs to carry twice as many leads in order to accommodate forward and reverse read and write capabilities. This provision of additional leads adds stiffness to the system that can inhibit or interfere with its motion capabilities.

Recent generations of multi-channel linear serpentine tape systems have used servo tracking to decrease track misregistration. The use of servo tracking has greatly reduced tracking errors due to manufacturing alignment and offset tolerances between the read and write element arrays, skew errors, some track shift due to tape substrate dimensional instability, and the effect of lateral tape motion. In such systems, position sensing read sensors (servo elements) detect prewritten servo tracks on the tape that can be laid down under more tightly controlled conditions to reduce misalignment of the servo tracks to the tape. The tape is typically divided into alternating bands of data tracks and servo tracks where the band of data tracks can be much wider than the servo band; typically the data band is 8 to 16 times the width of the servo band, depending on the number of data channels. From the output signals of the servo data elements, a position error signal can be determined that is used by the servo control loop to dynamically and more accurately position the data elements over their tracks. Typically, the servo elements are located in the same array as the read elements and are symmetrically placed outboard of the read array on each side.

Examples of typical primary head configurations for prior art orthogonal and azimuthal recording systems that utilize parallel gap lines on linear tape are shown in FIGS. 3–5. A common feature of the three illustrated configurations of FIGS. 3–5 is the inclusion of parallel read and write gaplines. Also basically common to all three configurations is the read and write modules, which differ in the thin film structure that is structured in known ways depending on whether the thin film element is part of a read or write module. In FIG. 2, a basic read or write module 30 that may be used in the prior art configurations or in making up modules in accordance with the present invention comprises a substrate 31 that is typically ceramic upon which is deposited a multi-layer patterned thin film sandwich 32 (structured as a read or write element) and that forms a gapline 33 that itself typically comprises a material layered onto the surface of the substrate 31 adjacent to the thin film structure 32, but may comprise any material effective for defining an operative magnetic gap. A closure piece 34, also typically ceramic, is shown that closes the gapline 33. The closure piece 34 would typically be bonded or otherwise connected in place to the ceramic substrate 31 aside or below the provision of the gapline 33 and/or directly to the material defining the gapline 33. After assembly, the module 30 would be conventionally machined and lapped to provide a tape bearing surface 35. The substrate 31 and closure 34 are normally comprised of the same ceramic material which may have several of the following characteristics: the material may be magnetic or non-magnetic and it maybe non-conductive, resistive, or conductive.

A standard orthogonal arrangement of heads for bi-directional tape motion is shown in FIG. 3. A portion of the magnetic tape 40 is illustrated, and in particular two adjacent data tracks 41 and 43 of any number of such data tracks are shown without transition lines to illustrate the orientation of head modules 50 and 55. When the tape 40 moves in a forward direction 42 (i.e. from the beginning of tape), the track 41, as an example, can be in a data transfer relationship with the head modules 50 and 55. When the tape 40 and thus track 43 moves in the reverse direction 44 (i.e. from the end of tape) and when the head modules 50 and 55 are shifted in the transverse direction 47 over the data track 43, then data transfer can be established between the head modules 50 and 55 with the data track 43. It is necessary during a read-while-write function (data writing followed by confirmation read) that the writing and reading are accomplished in separate gaplines because of the high level of interference that may be created as a result of the relatively much larger write signal coupling into the read signal, which interference can still occur if the write element (or array) and read element (or array) are in too close of a proximity to one another. The closer the proximity of the two gaplines, the larger is the potential for interference.

In the orientation shown, a first head module 50 comprises a write element 51 and a read element 52 that are positioned for writing followed by reading track 41 in the forward direction 42. A second head module 55 comprises a write element 57 and a read element 56 that are shown in FIG. 3 also positioned over track 41, but which can be shifted transversely as indicated by arrow 47, so as to be positioned for writing followed by reading of track 43 in the reverse direction 44. The two head modules can be bonded together to provide a unitary head module structure at interfaces 58 and 59, and with a construction as illustrated, would have the read and write gaplines aligned and parallel to one another in a direction perpendicular to the direction of tape motions 42 and 44. However, this system is limited in the ability to precisely position the read and write elements since the two head modules form a monolithic head and the read and write gaplines cannot be independently positioned. Alternatively, the head modules 50 and 55 can be independently controlled by the additional complexity of duplicate separately provided mechanisms for movement. One common configuration for independent precision positioning of the read and write elements utilizes both head modules 50 and 55 in each direction. So, for tape movement in the forward direction 42, writing is conducted by write element 51 of head module 50 and reading is conducted by read element 57 of head module 55. Conversely, writing is conducted by write element 56 of head module 55 and reading is conducted by read element 52 of head module 50 for tape movement in the reverse direction 44.

A dual independent head configuration for azimuth recording on linear tape is shown in FIG. 4. Two adjacent tracks 61 and 63 are shown with angled transitions as would be recorded on tape 60 with track 61 written in the forward direction 62 and track 63 written in the reverse direction 64. The transitions of track 61 are illustrated as being written at an azimuth angle $\theta$ by the write element 71 (or array of such elements) on head module 70 and read by read element 72 (or array of such elements) on head module 70. Likewise, track 63 is illustrated as being written at a similar azimuth angle of $-\theta$ by write element 77 (or array of such elements) on head module 75 and read by read element 76 (or array of such elements) on head module 75. For maximum precision in positioning head modules 70 and 75, independently positionable actuating mechanisms having two degrees of freedom allow the read and write element arrays in each head module to be positioned with respect to each other. Typically, the actuating mechanisms are actually connected together by a fixed mechanical linkage so that the positioning of one array influences the positioning of the other array; hence, any control system must be constructed to also accommodate these effects. For operation, the azimuthal head modules 70 and 75 move transversely in direction 67 in a similar manner as that described above for an orthogonal system with each head module responsible for data transfer with one of the tracks that, in this case, have oppositely angled transitions. Although the transitions of one track 61 need not be at the same angle $\theta$ as the transitions of an adjacent track 63, it is normal that they are to achieve similar recording densities.

FIG. 5 illustrates the use of a single head 90 that is rotatably positionable to provide a similar data transfer relationship between the head 90 and either of the oppositely arranged data tracks 81 and 83. The head 90 is also movable in transverse direction 87 to provide access to any number of such data tracks across the width of tape 80. The head 90 can be rotated through an angle of $2\theta$ to achieve an azimuth angle of $\theta$ for track 81 when writing or reading in the forward direction 82 and for writing and reading at a similar azimuth angle of $-\theta$ for data transfer with track 83 in the reverse direction. The head 90 includes three modules comprising a write element that is selectively positionable at positions 92 and 92' for writing in either direction 82 or 84 and a pair of read elements, one being positionable at 93 for reading track 81 in the forward direction 82 and the other read element being positionable at 91' for reading track 83 in the reverse direction 84. The read element positions noted at 91 and 93' are not used for data transfer with either track 81 or 83. A complementary configuration where a plurality of write elements are used with one read module is also possible and may be arranged instead with a read element positionable at 92 and 92'. Again, for precise positioning a two degree of freedom actuator is required to quasi-independently position the read and write elements.

SUMMARY OF THE INVENTION

The present invention provides improved methods and systems for data recording and reading for increasing overall tape data storage density as such data is written at an azimuth angle with respect to a data track direction for linear or helical tape systems. The present invention advantageously utilizes azimuth recording so as to substantially suppress or eliminate an adjacent track signal by using data transitions arranged at a large azimuth angle, preferably up to the maximum suppression level that can be attained at 45 degrees. By increasing such suppression well beyond that which is minimally effective, which as taught by the prior art decreases tape density in the direction of the track, tape areal density can be significantly increased by writing data to decreased data track widths with overall more data tracks for a given tape width. With significant and preferably maximized suppression of signals from adjacent data tracks, resulting lower data reading signals from a more narrow selected data track (i.e. relatively smaller magnetic domains in area) can be effectively read regardless of read head size requirement. So, even if track density in the data track direction is reduced by increasing the azimuth recording angle, that effect can be overcome and largely surpassed by reducing track width and providing significantly more data tracks for a given tape width. The present invention also provides recording head structures that may be used for large angle azimuth recording.

In an aspect of the present invention, a method of recording data in magnetic tape comprises the steps of moving a magnetic tape and a write element relative to one another for defining first and second recording directions; writing a first data track in the first recording direction during said movement and creating domains of opposite magnetization and a plurality of first spaced data transitions between the domains that are oriented at an azimuth angle of greater than twenty five degrees to a line that is perpendicular to the recording direction so that the magnetized domains between the plurality of first data transitions together define the first data track; and writing a second data track in the second recording direction during said movement by creating domains of opposite magnetization and a plurality of spaced second data transitions between the domains so that the magnetized domains between the plurality of second data transitions together define the second data track.

Preferably, the step of writing the second data track also comprises writing the second spaced data transitions between the domains of the second track at a reverse azimuth angle of greater than twenty five degrees to a line that is perpendicular to the recording direction. More preferably, the steps of writing the first and second data tracks comprises creating the first and second data transitions at forward and reverse azimuth angles with respect to a line perpendicular to the recording directions, respectively, at between forty and fifty degrees. Most preferably, the steps of writing the first and second data tracks comprises creating the first and second data transitions at forward and reverse azimuth angles with respect to a line perpendicular to the recording directions, respectively, at approximately forty five degrees.

Any number of additional data track in either the first recording direction or the second recording direction can be written in a similar manner as the first and second data tracks. By the present invention, data tracks much smaller in width than the prior art can be written, preferably less than twenty microns. Moreover, the tracks can be written directly adjacent to one another without a separation or buffer zone between them. The present invention is applicable to linear and helical type recording systems and techniques.

In another aspect of the present invention, a method of reading data that has been recorded on a magnetic tape comprises the steps of providing a magnetic tape having at least first and second data tracks, the first data track provided along a first data track direction with domains of opposite magnetization and a plurality of first spaced data transitions between the domains that are oriented at an azimuth angle of greater than twenty five degrees to a line that is perpendicular to the first data track direction, and the second data track provided along a second data track direction with domains of opposite magnetization and a plurality of second space data transitions; and moving the magnetic tape and a read element relative to one another along one of the first and second data track directions and thereby reading data from the magnetic tape.

The read element can be similarly oriented at the azimuth angle of the first data track for reading the first data transitions of the first data track. Moreover, the second data track on the magnetic tape can also be provided as having domains of opposite magnetization separated by the second data transitions that are oriented at a reverse azimuth angle of greater than twenty five degrees to a line that is perpendicular to the second data track direction. A read element can be similarly oriented during a first reading step at the azimuth angle of the first data track for reading the first data transitions of the first data track and the read element can then be reoriented to be similarly oriented during a second reading step at the reverse azimuth angle of the second data track for reading the second data transitions of the second data track. Alternatively, a first read element can be similarly oriented during a first reading step at the azimuth angle of the first data track for reading the first data transitions of the first data track and a second read element can be similarly oriented during a second reading step at the reverse azimuth angle of the second data track for reading the second data transitions of the second data track.

More preferably, the step of providing the magnetic tape comprises providing a magnetic tape with first and second data tracks with the azimuth angle of the first data track at between forty and fifty degrees to a line perpendicular to the first data track direction, and with the reverse azimuth angle of the second data track at between forty and fifty degrees to a line perpendicular to the second data track direction. Most preferably, the step of providing the magnetic tape comprises providing a magnetic tape with first and second data tracks with the azimuth angle of the first data track at approximately forty five degrees to a line perpendicular to the first data track direction, and with the reverse azimuth angle of the second data track at approximately forty five degrees to a line perpendicular to the second data track direction. In accordance with the present invention during a reading step of an one data track, an adjacent track signal from any adjacent data track can be sufficiently suppressed for effective reading of data of the desired data track. The read element can be provided as being of a greater width than the width of the data tracks when oriented similarly so as to overlap the adjacent data track as positioned in such orientation. As above, the system can be linear or helical in accordance with the present invention.

In accordance with another aspect of the present invention, a magnetic tape is provided as having recorded thereon a first data track extending in a first data track direction along the magnetic tape and a second data track extending in a second data track direction along the magnetic tape, the first and second data tracks being parallel to one another, and wherein the first data track comprises domains of opposite magnetization and a plurality of first spaced data transitions between the domains that are oriented at an azimuth angle of greater than twenty five degrees to a line that is perpendicular to the first data track direction. The second data track can also comprise domains of opposite magnetization and a plurality of second spaced data transitions between the domains that are oriented at a reverse azimuth angle of greater than twenty five degrees to a line that is perpendicular to the second data track direction.

More preferably, the first data track has the azimuth angle of its first data transitions at between forty and fifty degrees to a line perpendicular to the first data track direction, and the second data track has the reverse azimuth angle of its second data transitions at between forty and fifty degrees to a line perpendicular to the second data track direction. Most preferably, the first data track has the azimuth angle of its first data transitions at approximately forty five degrees to a line perpendicular to the first data track direction, and the second data track has the reverse azimuth angle of its second data transitions at approximately forty five degrees to a line perpendicular to the second data track direction. The first and second tracks can have similar track widths that are preferably less than twenty microns. Any number of such data tracks can be provided across a tape width.

In accordance with yet another aspect of the present invention, a magnetic tape data transfer system employs read and write elements to be positioned relative to a magnetic tape and to permit relative movement between the elements and the magnetic tape, wherein the system comprises a head module having a tape facing surface provided to accommodate movement of a magnetic tape relative to the head module in a data transfer direction; a first element operatively provided along the tape facing surface, the first element oriented at a first azimuth angle of greater than twenty five degrees with respect to the data transfer direction; and a second element provided at a second azimuth angle to the data transfer direction, wherein the second azimuth angle is different than the first azimuth angle. The second element can also be provided as oriented at a reverse azimuth angle with respect to the first element, the reverse azimuth angle being greater than twenty five degrees with respect to the data transfer direction.

More preferably, the azimuth angle of the first element and the reverse azimuth angle of the second element are between forty and fifty degrees with respect to the data transfer direction. Most preferably, the azimuth angle of the first element and the reverse azimuth angle of the second element are approximately forty five degrees with respect to the data transfer direction so that the first and second elements are oriented at approximately ninety degrees from one another.

BRIEF DESCRIPTION OF THE DRAWINGS

The accompanying drawings, which are incorporated in and constitute a part of this application, illustrate several aspects of the invention and together with a description of the embodiments serve to explain the principles of the invention. A brief description of the drawings is as follows.

DETAILED DESCRIPTION

The present invention is premised upon the discovery that by increasing azimuth angle, data storage density for a given tape width can be increased significantly more than the cosine θ loss in linear track density, as discussed above in the Background Section, allowing a greater increase in areal density than is possible with orthogonal or conventional azimuth recording. In particular, using an azimuth angle that is higher than current azimuth recording techniques, preferably over 30 degrees, and most preferably at or near 45 degrees, can substantially reduce or eliminate all undesirable side track signals and allowing the read transducer to be extended to two times or more of the data track width. The size of the read transducer would be effectively limited, however, by any further track of a similar transitional azimuth (i.e. by the track after the adjacent one). A large angle azimuth data track in accordance with the present invention can be advantageously decreased in width to approximately the width of a conventional orthogonal read element width without loss of signal amplitude, SNR, or defect sensitivity. Data track widths can be as small as desired provided that the read head can effectively detect the magnetic domains and transitions of any such data track.

Figure 6:
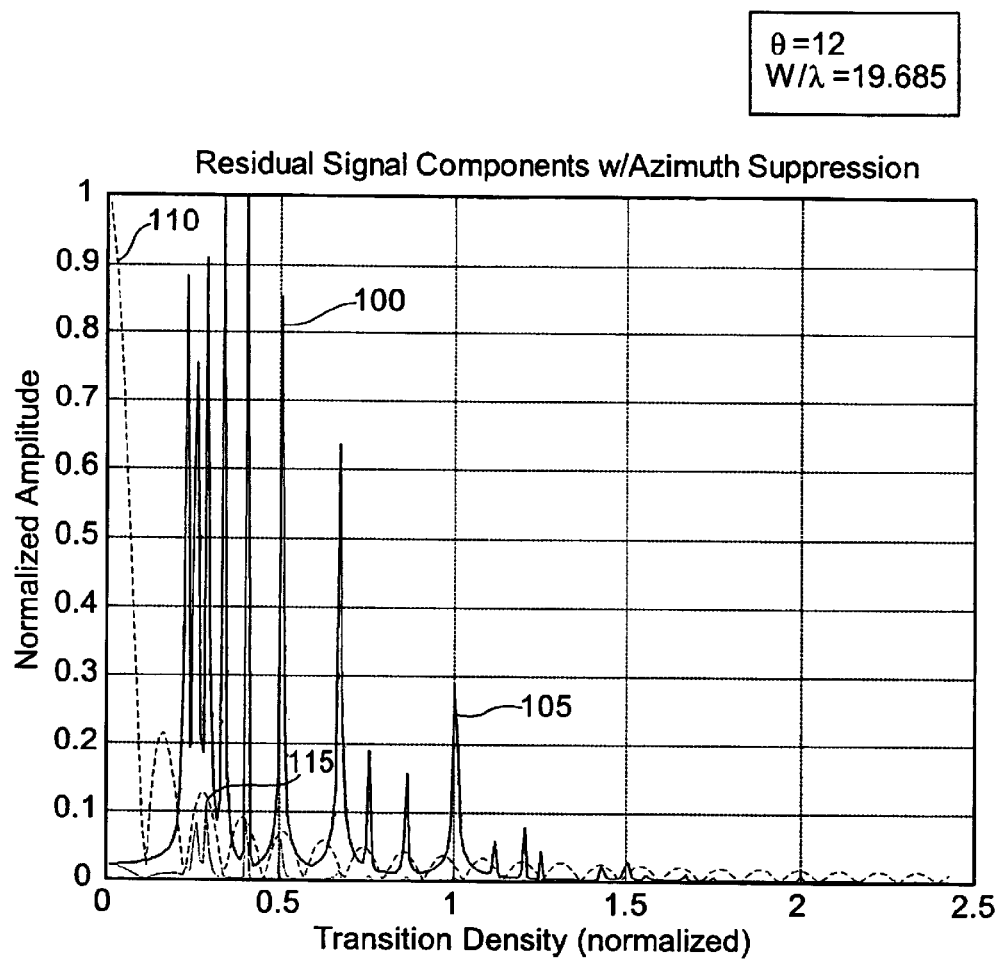
FIG. 6 is a graph showing an example of the primary components of an adjacent track signal spectra for a small angle azimuth recording superimposed with a sin x/x suppression curve where the track density as denoted by the $W/\lambda_{max}$ ratio is approximately 20 (W/maximum transition spacing is 40) and the resultant residual signal.

In FIG. 6 a signal spectra for one specific example of a typical recording in tape is shown where the wavelength λ of the lowest density is much shorter than the track width W. The individual spectra for each of the possible densities for a 1, 7 run-length-limited (RLL) signal, as the specific example, can be seen. As discussed more in detail below, such a signal spectrum would result as comprising the signal of the track that is being read as well as the signal components from adjacent tracks. That is, a component of the detected signal for each density illustrated for the given example will include some effect from adjacent tracks that is detected as side-track signal. Run-length-limited codes describe the characteristics of the data pattern recorded on the media. RLL codes are described by RLL (d, k) where d is the minimum number of clock cells between transitions and k is the maximum number of clock cells between transitions representing the maximum and minimum transition densities. Thus in this example, using ones and zeros as representing domains of opposite magnetization, as few as a single "one" can be recorded between subsequent lines of transition and as many as seven "ones" may be recorded between subsequent lines of transition according to the code.

In FIG. 6, a signal spectrum generally noted by solid line 100 is illustrated that represents signal density components that would result from the tracked signal as well as from the side or off track interference signals of an adjacent track. The peaks include, in particular, peaks that correspond to the possible densities of a 1, 7 RLL code as noted above. More particularly, the spectrum 100 was determined for a recording having a track width to maximum spacing between recorded transitions ratio of approximately 20:1 (corresponding to a maximum bit length to track width ratio of 10:1). The "all ones" density (in this case a seven "ones" maximum linear density) is denoted as peak 105 of the signal spectrum 100. A suppression curve 110 for an azimuth angle of twelve degrees is also illustrated as a dashed line and is superimposed over the off track signal spectrum 100. According to this graphical illustration in FIG. 6, the distance from the X-axis to the suppression curve 110 graphically indicates the effect of the side track signal as a component of the detected signal for a given density. In particular, an "all ones" (maximum density) peak 105 is shown, for example, in comparison to the achievable attenuation (in the form of the suppression curve 110) for an azimuth angle of 12 degrees. Accordingly, FIG. 6 illustrates that while several of the spectral component peaks of the spectra 100 are located at a null point of the suppression curve 105 (showing that the detected signal is all or mostly comprised of the tracked signal), one or more of the major components of the detected signal also fall on or near a lobe of the suppression curve 110. A residual signal spectrum curve 115 is shown in dotted line that represents the adjacent track signal after suppressing the adjacent track signals by a suppression based upon a twelve degree azimuth as represented by the suppression curve 110. Thus, when azimuth recording is employed at an angle of 12 degrees with the recording parameters described above, the lowest spectral component in the adjacent track signal can be reduced by nearly 88 percent. The suppression of the higher frequency signal components is even greater.

Most of the future gain in areal recording densities is expected to occur through linear or bit density increase. In particular, it is expected that the $W/\lambda_{max}$ ratio may decrease by a factor of ten. Thus, in FIG. 7, the same signal spectrum 100 is graphed to represent a similar signal with density components comprising both tracked and adjacent signal components as in FIG. 6. However, for this example, an increased track density of ten times that of FIG. 6 is considered for a similar track width W. A suppression curve 120 for an azimuth angle of 12 degrees and with a ten times increased linear density is also shown superimposed with the signal spectra 100. Also, a residual signal curve 125 is illustrated showing the effect of the side track signal as a component of the detected signal spetrum. For these parameters, the residual spectra is illustrated as comprising about 83% of the un-suppressed side track signal. In other words, only about 17% of the side track signal can be suppressed and the removed from the detected signal for an azimuth angle of 12 degrees at the ten times increased linear density and according to these recording parameters.

Figure 7:
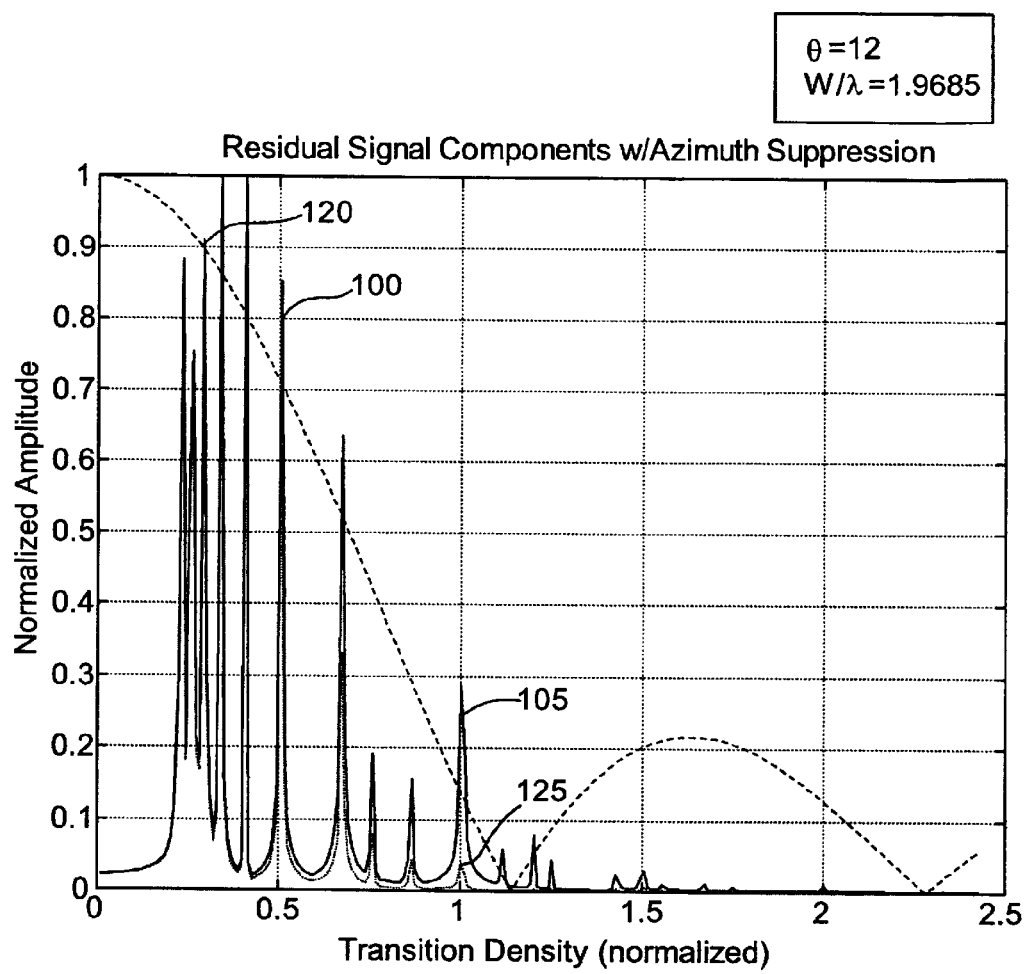
FIG. 7 is a graph showing the adjacent track signal spectra for the small angle azimuth recording as in FIG. 6 where the track density is increased by a factor of 10 resulting in a $W/\lambda_{max}$ ratio that is approximately 2 for the same azimuth angle.
Figure 8:
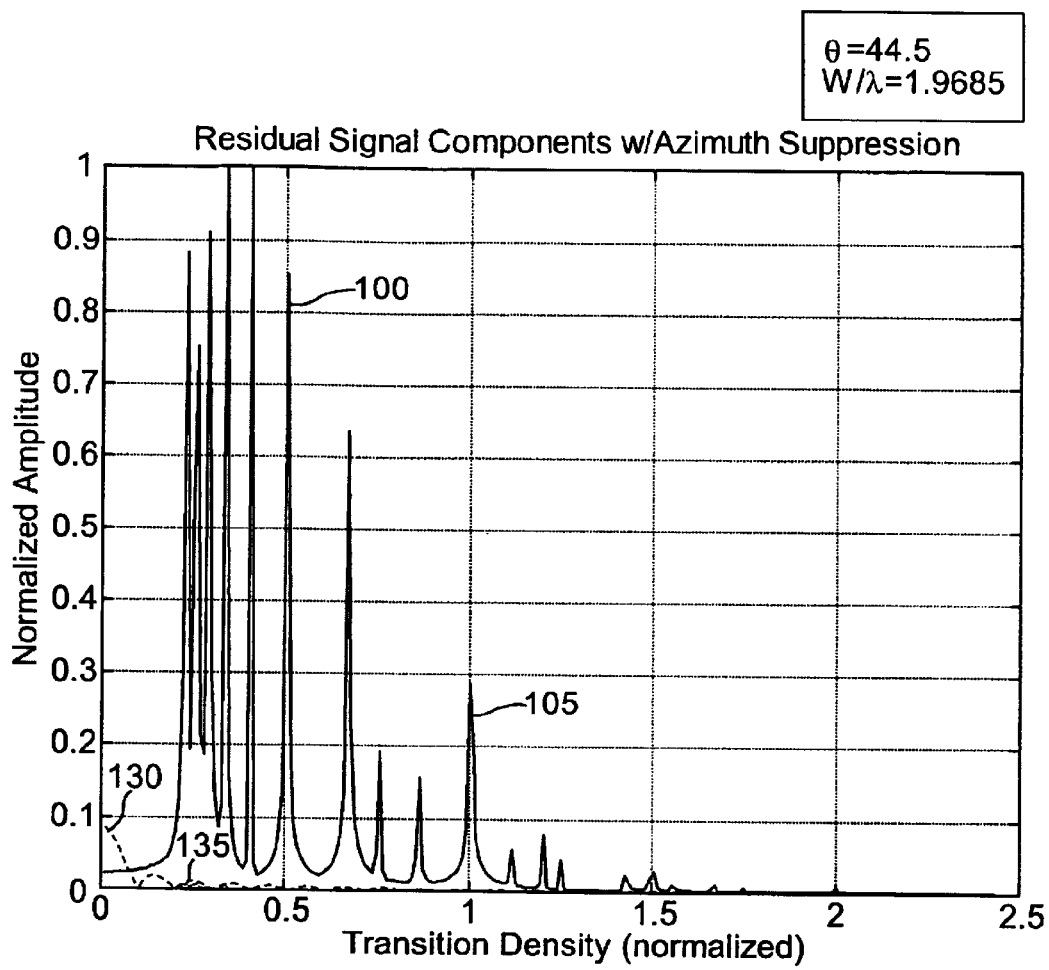
FIG. 8 is another graph showing the adjacent track signal spectra similar to that shown in FIGS. 6 and 7, but for a large angle azimuth in accordance with the present invention (an angle of only 44.5 degrees is illustrated instead of the maximum of 45 degrees in order for the suppression curve to be seen on the graph) superimposed with a sin x/x suppression curve and that illustrates a very small residual adjacent track signal.

The issue of low attenuation, as shown in FIG. 7, can be resolved by increasing the azimuth angle in accordance with the present invention. The effects of changing the azimuth angle are shown in FIG. 8.

In accordance with the present invention, data tracks are recorded at an azimuth angle (with respect to perpendicular direction to the track axis of a data track along the tape, which track axis may be in the direction of tape movement as in linear recording or at an angle itself as in helical recording) that is significantly greater than the angles suggested and taught by the prior art to increase suppression of adjacent track signal even as such increase can negatively affect linear density. In accordance with the present invention, such loss of linear density from greater azimuth angle recording is more than offset by the discovery that areal density can be significantly increased by reducing track widths and thus providing more tracks across a given tape width. Moreover, data tracks can be positioned adjacent to one another without loss of area between them. That is, there is no need to provided a non-recorded buffer zone between tracks for suppression purposes.

Track widths can be reduced as low as can be effectively detected by a read head, which read head itself can be significantly larger than the track width because even as it passes over adjacent tracks to some degree, that adjacent track signal can be effectively suppressed. Read heads themselves can thus be utilized as such are governed by performance characteristics largely independent of size. A read head would, however, be preferably limited so as not to extend to be effected by a next track of similar azimuth angle, as such would be provided in accordance with preferable data tracks of the present invention at every other data track. Read heads themselves are not critical to the present invention, and any conventionally known head making technique or developed head making technique can be utilized to provide suitable read heads in accordance with the present invention.

Preferably, the azimuth angle of data transitions in accordance with the present invention is greater than twenty five degrees (which correlates to between twenty five and sixty five degrees, as the suppression is maximum at forty five degrees), and more preferably greater than forty degrees (between forty and fifty degrees), and most preferably, at or near the maximum of forty five degrees.

In FIG. 8, a similar signal spectrum 100 is shown with the same ten times linear density as shown in FIG. 7, but with an azimuth angle of 44.5 degrees. A suppression curve 130 is also illustrated that results in an adjacent track interference residual signal curve 135 that is reduced by 99 percent. Hence, an azimuth angle error of a degree or so has little impact of the suppression capability.

The following Table 1 shows suppression values as determined in accordance with the methodology of the above discussed graphs of FIGS. 6, 7 and 8 for various angles θ of data transition recording and with a W/λ equal to 1:

| θ  | Suppression |
|----|-------------|
| 10 | 14.2%       |
| 15 | 33.5%       |
| 20 | 62.3%       |
| 25 | 78.3%       |
| 30 | 85.1%       |
| 35 | 90.6%       |
| 40 | 94.5%       |
| 42 | 96.7%       |
| 44 | 98.9%       |
| 45 | 100%        |

As can be seen, suppression becomes significant in that more than half of the adjacent track signal can be suppressed at between fifteen and twenty degrees. However, depending on the signal density components of the read track, that may not be enough for a given recording based upon data track width W and wavelength λ, either of which can be modified to achieve any desired value of W/λ. So, for example, if a suppression of around eighty percent is needed for track signal quality, and as based on the Table 1 above an azimuth angle θ of twenty five degrees is utilized, any density wavelength can be determined based upon a desired track width to achieve a W/λ of approximately one (as such Table 1 information is based upon a W/λ of 1) or vice versa. With an azimuth angle θ approaching forty five degrees, suppression is high at any W/λ so linear density and track width can be chosen based primarily on other design constrains, such as the ability of any known or developed read head element to effectively read such a signal from the desired track.

Current track widths for data storage on linear tape are typically about 20 microns. With azimuth recording in accordance with the present invention and independent tracking of read and write elements also in accordance with preferred systems and methods of the present invention and discussed more below, track widths of as small as 0.5–1.0 microns or less are believed possible.

Azimuth suppression at any degree is symmetrical about forty five degrees, i.e., suppression at forty degrees equals suppression at fifty degrees. However, as discussed in the Background section above, the linear density loss due to the reduction in bit cell length along the track to maintain constant effective linear density linearly increases. That is, effective bit density equals density (angle θ equals 0)*cos θ} with increasing angle θ. Since equivalent suppression can be achieved at angles up to forty five degrees, it is preferable not to exceed an azimuth angle of forty five degrees. As above, it is preferable to use azimuth angles for data transitions at about twenty five degrees or more for increasing suppression above levels desired by the prior art based upon the development of the present invention to also decrease track width and thus increase areal density for a data storage medium, such as magnetic tape.

Figure 1:
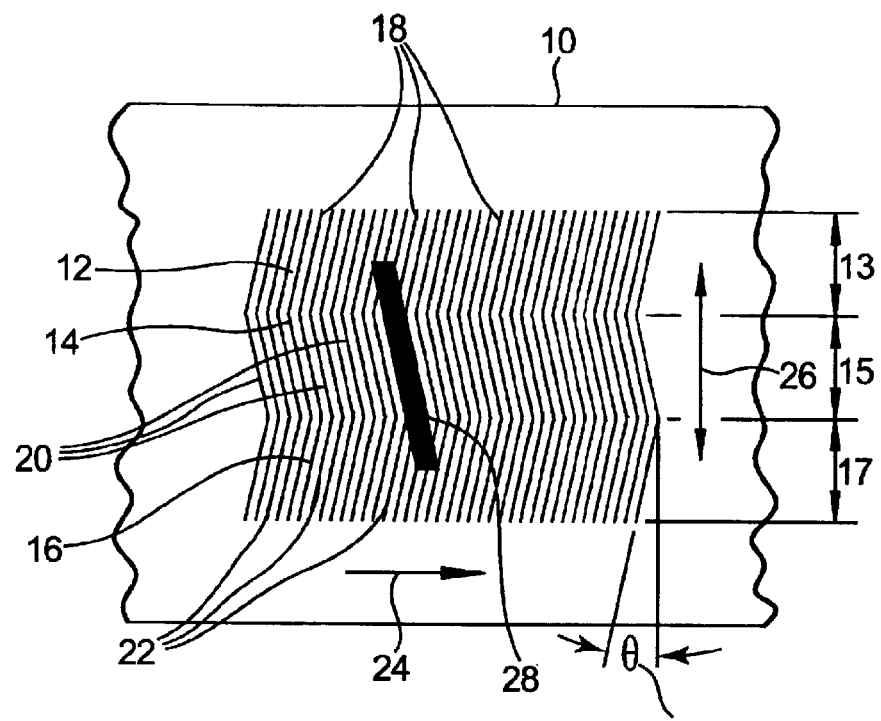
FIG. 1 is a schematic illustration of a head positioned in data transfer relationship to a portion of a prior art magnetic tape arrangement having plural data tracks that include spaced data transitions oriented at a small azimuth angle with respect to a line transverse to the tape and that is perpendicular to the direction of extension of data tracks that are arranged to extend in a tape travel direction.
Figure 2:
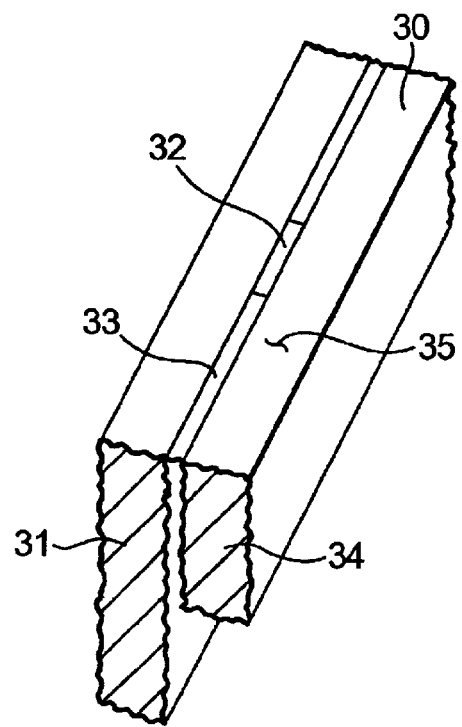
FIG. 2 is partial perspective view of a basic head configuration that can be utilized in accordance in head constructions of the present invention as a read or write module.
Figure 3:
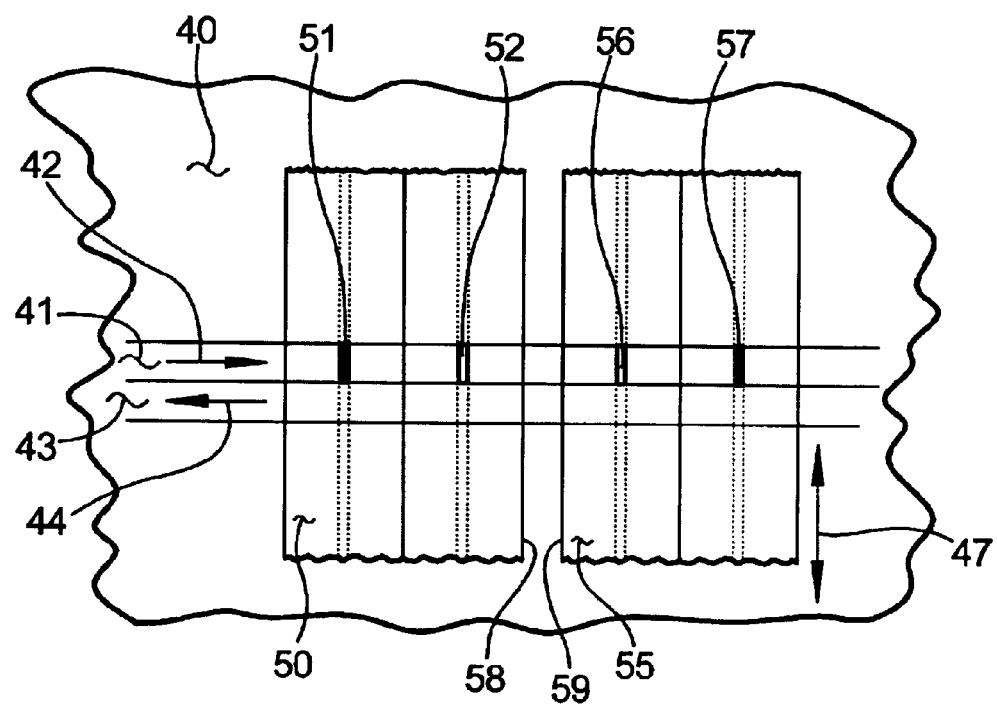
FIG. 3 is a schematic illustration of a head configuration used in prior art linear orthogonal tape recording.
Figure 4:
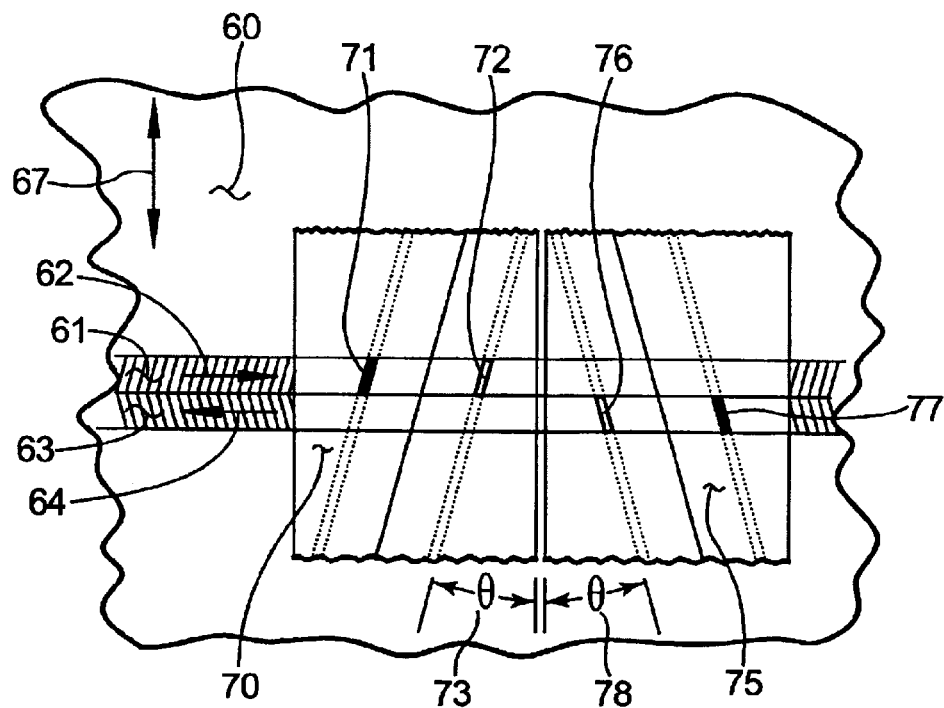
FIG. 4 is a schematic illustration of a head configuration for azimuth recording having a plurality of head modules that may be independently movable or movable together and that is shown over data tracks arranged in accordance with prior art methods, but which arrangement is also applicable to data tracks in accordance with the present invention.
Figure 5:
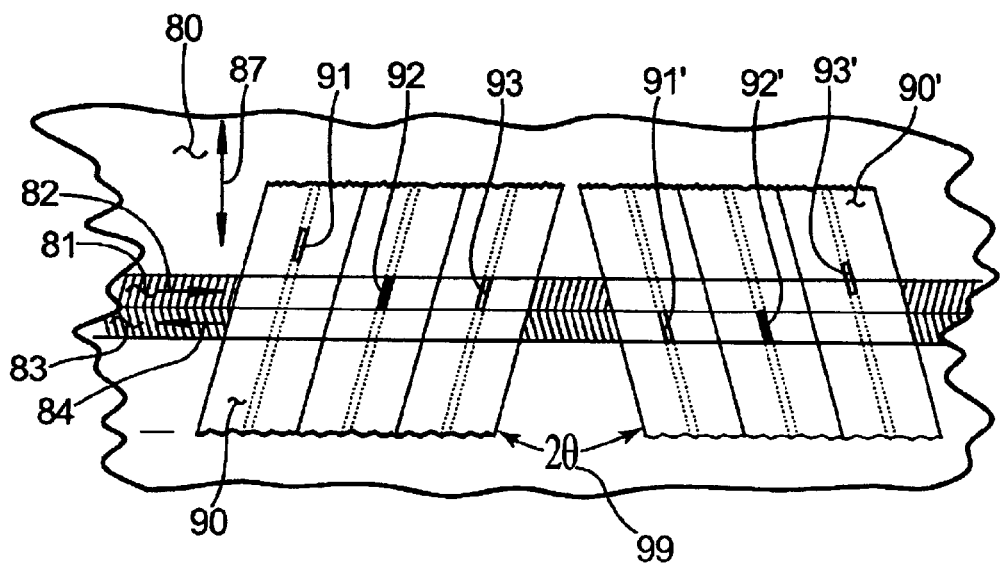
FIG. 5 is a schematic illustration of a head configuration for azimuth recording having a single head module that is rotatable and that is shown over data tracks arranged in accordance with prior art methods, but which arrangement is also applicable to data tracks in accordance with the present invention.

In accordance with another aspect of the present invention and in order to achieve very high track densities as contemplated above, it is preferable to position read and write head arrays independently when recording. Typically, for a given tape width with many data tracks positioned adjacent to one another, read and write heads are arranged in arrays that are movable across the data tracks together so as to increase data transfer rates. Moreover, one or more of the elements of such an array is typically a read servo sensor, the use of which is well known for guiding head positioning. Position tracking read servo sensors of each array provide output signals, as well known, that can be used to more precisely position that array with maximum accuracy. Referring to FIG. 2, such read and write arrays can be provided in the manner described above, wherein any number of thin film read and/or write head elements 32 can be created in a gapline 33 as provided between a substrate 31 and closure piece 34. That is, at predetermined spaced locations along any such gapline 33, any number of read and/or write elements 32 (including servo read elements) can be provided as conventionally known or as developed in the future. For reducing interference signals between head elements 32, particularly from write head elements to read head elements, separate gaplines 33 are preferably created in accordance with configurations of the present invention as described and suggested below.

To position the read and write arrays independently, each array is preferably independently steered by signals from its own servo read elements. Moreover, each array can be driven by an independent actuator or by a common actuator that has at least two degrees of freedom that depend on the direction that the data storage tracks are moving relative to the head elements. The following configurations illustrate independent head modules with each module containing non-colinear read and write arrays that are preferably independently controllable by independent actuators. Any known or developed methods, techniques and devices for independently positioning and controlling head modules or arrays are contemplated to be usable with the configurations of the present invention, examples of which are described below. In particular, methods, techniques and devices usable in accordance with the present invention include those disclosed in U.S. Provisional Application Ser. No. 60/469,518 filed on May 9, 2003 entitled "DUAL MODULE HEAD," to Dugas et al. and the entire contents of which is fully incorporated herein by reference. Independent actuators are preferred for each array because of the problems associated with single compound dual freedom of motion actuators as noted above in the Background section based upon the additional mass thereof and need to carry twice as many leads for forward and reverse read and write capability.

Preferably, both the read and write arrays contain sensors (servo read elements) for detecting the transverse position of the head from information prerecorded on the tape. As above, the servo position sensor should be embedded in the gapline 33 of the data transfer head modules 30. For preferred module constructions in accordance with the present invention, gaplines of the read and write arrays are preferably canted at opposite angles of θ from the transverse axis of the tape whose projected intersection forms an apex angle of 2θ.

For preferred systems of the present invention, a pair of head modules 30 are used in tandem with each head module 30 independently positionable so that each head module 30 can independently follow a same servo track that has been recorded on a data storage tape. More than two such head modules 30 may also be used in synchronization. The read and write elements 32, as provided in arrays on the multiple modules, are preferably aligned so that when writing data as a storage tape is moved in a first direction with the write array of one of the head modules at a determined azimuth angle θ, that written data can be immediately subsequently read by a similarly aligned read array at a similar azimuth angle θ of a second head module and vice-versa for the data storage tape moving in an opposite direction.

Figure 9:
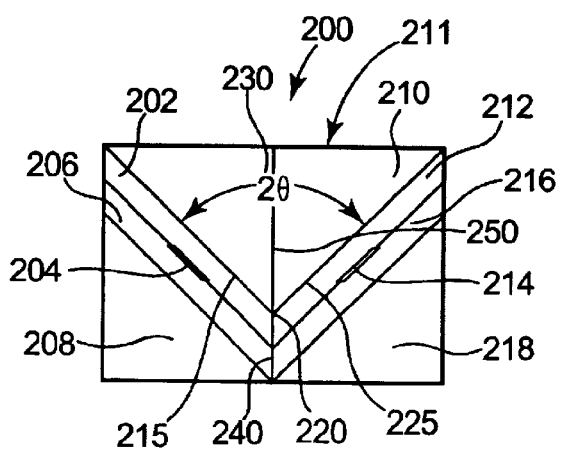
FIG. 9 is a schematic illustration of a head module of the present invention showing an azimuth reference block.

Each of the preferred head modules in accordance with the present invention include a read portion and a write portion effectively separated from one another to eliminate any interference from one portion to the other, which portions can be provided as part of an integrated structure comprising any number of components. As schematically illustrated in FIG. 9, a read portion of a head module 200 preferably includes a ceramic substrate 202 upon which is deposited or otherwise formed a patterned thin film structure 204 that may contain an array of elements for reading data and servo position information from a data storage tape to form a gapline. As above, the gapline can be conventionally created with other material bonded between the substrate 202 and a closure piece 206. The ceramic closure piece 206 would also be conventionally bonded to the thin film structure 204. Any known or developed materials can be used for such construction including preferred ceramic materials for the substrate 202 and closure piece 206. The head module also preferably contains a write portion with a ceramic substrate 212 upon which a patterned thin film structure 214, which preferably contains an array of elements for writing data and one or more elements for reading servo position information from the tape, is deposited or otherwise formed to create another gapline. Again, the gapline may further comprise other material so that a ceramic closure piece 216 can be also preferably bonded to the gapline including the thin film structure 214.

Preferably, a read portion and a write portion can be separately mounted on one of the reference faces 215 and 225 of a triangular reference block 210 that is preferably also a ceramic material, so that an apex of either gapline with the reference face of the other gapline forms an angle of 2θ. Any number of other additional blocks also preferably of ceramic material can also be mounted to the closure pieces 206 and 216, such as illustrated at 208 and 218, or to any other edges of the head module 200. Moreover, the two head portion structures may further be cut or sliced as desired and may also be further formed or ground to form desired shapes, such as rectangles of a similar size.

In the case of creating a head module 200 from separate head portion components, such as indicated by a bond line 250 (as a dashed line in FIG. 9), each substrate 202 and 212 with thin film structures 204 and 214, respectively, and closure pieces 206 and 216, respectively, can be mounted to an independent reference block that comprises a portion of the reference block 210. Preferably for such construction, each portion would comprise a bisected portion so that each gapline would create a similar apex angle of θ with the bond line face of each reference block (to create bond line 250).

The two structures can be bonded along the bond line 250 so that the projection of the read gapline and the write gapline forms an apex of 2θ bisected by the bond line 250.

As above, a read portion and a write portion (as each would comprise at least a substrate, thin film structure and closure piece of the described head structures) may be each mounted on one face of a single triangular or truncated triangular reference ceramic block 210 whose apex or projected apex forms an angle of 2θ. Any number of additional blocks of ceramic or other material can also be mounted on any of the edges of each portion or of the reference block 210, which components may be cut or sliced and machined in any way to form any desirable shape, such as a rectangle. In the case of a rectangle, as illustrated, a back surface 211 of the reference block 210 provided as the back face from the reference triangle or truncated triangle would be perpendicular to a line that bisects the apex into two angles of θ.

With such read and write portions mounted on faces of a single triangular or truncated triangular reference block 210 either of the substrate or the closure piece of either or both portions can be fabricated to produce the desirable module shape instead of including additional pieces, such as 208 and 218. That is, depending on their orientation to the reference block 210, which itself may comprise one or more components, the substrate and closure pieces can be provided of sufficient material thickness so that additional blocks are not needed in order to provide enough material for any subsequent fabrication steps for creating any desired structural shape of the module 200, such as into a rectangle. Alternatively, either portion of a head module having separately provided read and write portions that are bonded together, such as along a bond line 250, can include sufficient additional material so that one of the portions can provide the material that also serves as the basis of the reference block. That is, the reference block itself can be created from material of or combined with a component, such as a substrate or closure piece, of either read or write portion. For example, the substrate or closure piece of either read or write portion can extend far enough from the gapline of that portion so as to extend beyond the distance of the gapline of the complementary portion. The extended portion can then be cut or sliced at an angle of 90 degrees minus θ with the plane of the complementary gapline. The complementary portion can then be mounted and bonded against the angled reference face of the extended portion of the other portion and the entire structure can thereafter be cut or sliced and machined to form any desired shape, such as a rectangle whose back face 211 from the apex formed by the projected intersection of the read and write gaplines would be perpendicular to a line formed by the angular bisection of the apex angle.

Exemplary head configurations in accordance with the present invention and that can be used for large angle azimuthal recording are described below. As described above, a generalized construction for head modules with non-parallel arrays is illustrated schematically in FIG. 9. The head module 200 preferably comprises a ceramic substrate 202 upon which a patterned thinfilm read or write structure 204 is deposited. A ceramic closure piece 206 is then preferably bonded to the thin film structure 204 along with any other gapline defining material. The substrate 202 is then also bonded to a face 215 adjacent to the apex 220 of the azimuth reference block 210 whose apex angle 230 is 2θ. A further ceramic support piece 208 may then be bonded to the ceramic closure piece 206, preferably to provide a portion of an overall rectangular head module configuration, with the understanding that any desired shape can be provided by any number of components, as described above. Another patterned thinfilm read or write structure 214, which is preferably complementary to the read or write function of thinfilm structure 204, is deposited on substrate 212. Then preferably, a ceramic closure piece 216 is bonded to the thinfilm structure 214 and any other gapline defining material, and a ceramic support piece 218 may then be bonded to the closure piece 216. This assembly can then be bonded to the other face 225 of azimuth reference block 210 to form the head module 200. It is recognized that the bonding sequence may be altered and/or that other mounting or connecting techniques can be used to join the components together. Moreover, it is also preferable to utilize similar ceramic material in making up the substrates, closure pieces, support pieces and the reference piece(s). In manufacturing situations where it is difficult to machine and align the components including the substrates, gaplines and closures making up the head arrays at an apex interface 240, it may be desirable to split the reference block 210 into components, such as along a line bisecting the apex angle 230 into two halves and then to assemble each substrate/thin film array/closure piece/support piece as portions of a head module and then to bond the two halves along interface 250.

Figure 10:
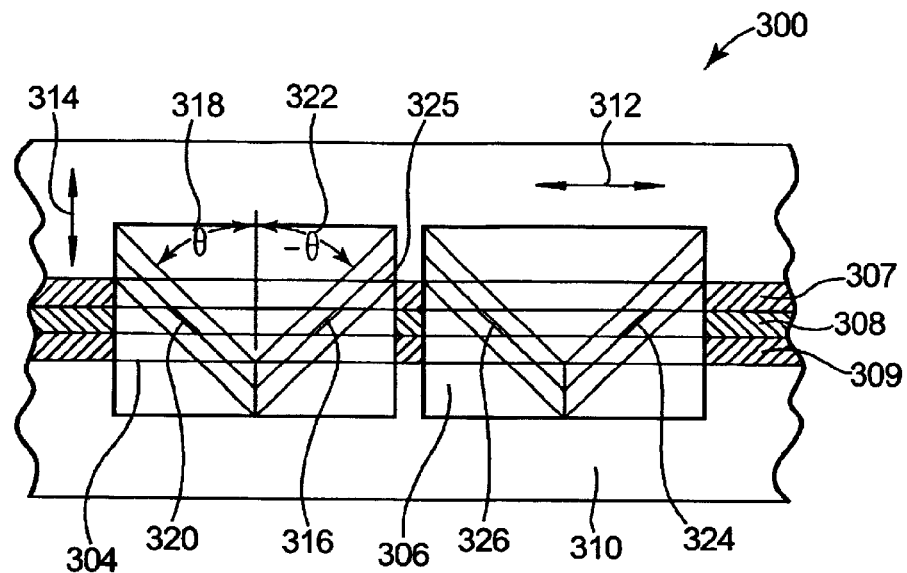
FIG. 10 is a schematic illustration of a pair of head modules in accordance with the present invention, each head module having read and write elements oriented in a vee configuration and positioned for data transfer with one data track.
Figure 11:
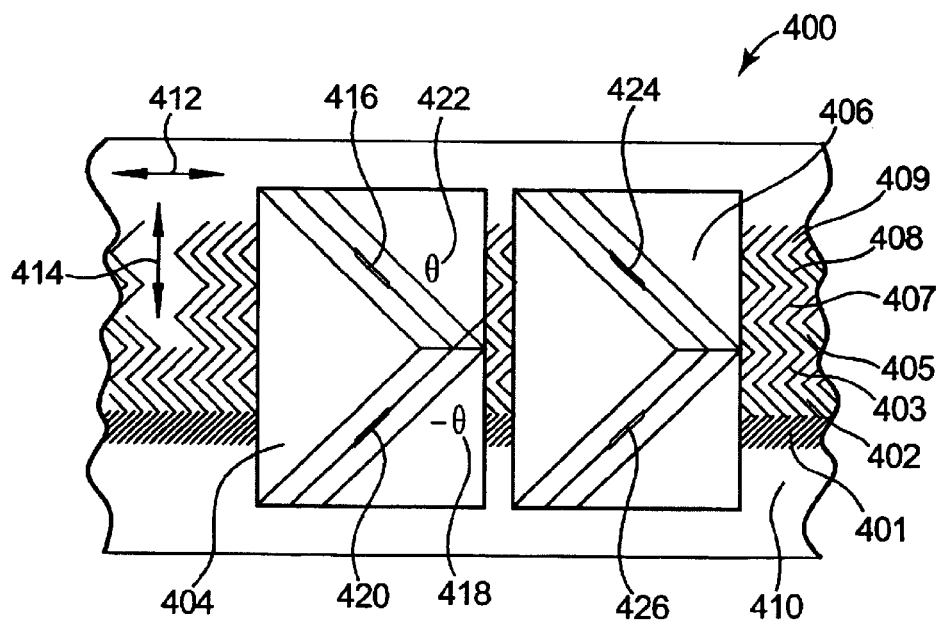
FIG. 11 is a schematic illustration of a pair of head modules in accordance with the present invention, each head module having read and write elements oriented in a sideways vee or chevron configuration and positioned for data transfer with one data track.

For example, a preferred "vee" arrangement 300 is schematically shown in FIG. 10 and a preferred "chevron" or sideways "vee" arrangement 320 is schematically shown in FIG. 11. Generally, FIGS. 10 and 11 each illustrate the use of two independently controllable and positionable head modules. More preferably, each head module contains an array of one or more read elements with one or more servo read elements and an array with a matching number of write elements with one or more servo read elements, wherein the elements of one array of one module are oriented at opposite azimuths to the elements of the other array of that same module so that they can be aligned, azimuthally, with their counterparts in the other head module. The azimuthal angle shown is for drawing convenience only. As described above, the azimuth angle chosen is preferably a large angle azimuth angle of greater than twenty five degrees, more preferably greater than forty degrees, and most preferably about 45 degrees.

More specifically, the "vee" arrangement 300 shown in FIG. 10 includes a first head module 304 and a second head module 306 shown positioned above a data track 308 of a tape 310. The tape 310 has a direction of travel 312 and a transverse axis 314, thereto. The first head module 304 includes a read element 316 (that may represent a single element of any number of elements provided in an array) that is oriented at an azimuth angle 318 that is measured with respect to the transverse axis 314. The first head module 304 also includes a write element 320 (or array of elements) that is oriented at an azimuth angle 322 that is also measured with respect to the transverse axis 314 and that is preferably the same as but oppositely directed as the angle 318. Similarly, the head module 306 includes a read element or array 326 that is oriented at the angle 318 and a write element or array 324 that is oriented at the angle 322. As such, the read array 316 and the write array 324 cooperate to perform a write and read/verify function for tape traveling in a first direction (tape moving to the left as viewed in FIG. 10). For data transfer with the tape 310 in the first direction, read and write arrays 316 and 324 would be shifted from that illustrated to a reversed azimuth track, such as are illustrated by the adjacent tracks 307 and 309. The read array 326 and write array 320 can similarly perform a write and read/verify function for tape traveling in a second direction (tape moving to the right as viewed in FIG. 10) that is opposite to the first tape direction. For data transfer with the tape 310 in the second direction, read and write arrays 326 and 320 could be position, as shown, over data track 308 or to any similarly provided azimuthal data transitions. Positioning of each of the head modules 304 and 306 is preferably independently controlled, as described above, although a dependent control can be used where movement of one module follows or is linked to the movement of the other, where as here, the elements are aligned from module to module.

The "chevron" or sideways "vee" arrangement 400 is schematically shown in FIG. 11. This structure also includes first and second head modules 404 and 406 that are shown positioned above a tape 410. The tape 410 has a direction of travel 412 and a transverse axis 414. The first head module 404 includes a write element or array 420 oriented at an azimuth angle 418 that is measured with respect to the transverse axis 414. The first head module 404 also includes a read element or array 416 oriented at an azimuth angle 422 that is also measured with respect to the transverse axis 414 and is preferably similar to but oppositely directed as the angle 418. Similarly, the head module 406 includes a read element or array 426 that is oriented at the angle 418 and a write element or array 424 that is oriented at the angle 422. In this type of structure, the read array 426 and the write array 420 can be used to read and write data for tape traveling in a first direction (tape moving to the right as viewed in FIG. 11) while the read array 416 and the write array 424 can be used to read and write data for tape traveling in a second direction (tape moving to the left as viewed in FIG. 11) that is opposite the first direction. As illustrated, read and write arrays 416 and 424 of head modules 404 and 406 are positioned for data transfer with data track 408 for tape movement in the second direction. A similar data transfer relationship can be accomplished for other tracks 402 and 405 (and any number of others) with the same azimuthal data transitions by shifting both head modules independently or together. For data transfer with reversed azimuth data transitions, such as shown at 403, 407 or 409 (and any number of others) read and write arrays 426 and 420 can be independently or dependently shifted in position over the desired data track. Track 401 is illustrated to represent a servo track that may be read by elements of read array 426 that may be positioned within such array to read the servo track in either tape movement direction. It is contemplated that in order to accommodate mechanical configurations of any particular positioning actuator and/or any flex cabling constraints that heads 306 and 406 can be rotated by 180 degrees relative to heads 304 and 404 with appropriate changes in the locations and structures of the read and write arrays. That is, the arrays can be reversed in azimuth with also a reversal in reading and writing functions as following the azimuth angle of a selected data track.

It is also noted that instead of using a preferred multiple head module system as described above and illustrated, large angle data transfer can be accomplished with a single head module that is further rotatable to reverse its azimuthal orientation depending on a selected data track. Rotating heads themselves can include any conventional or developed techniques and devices to provide such function.

Figure 12:
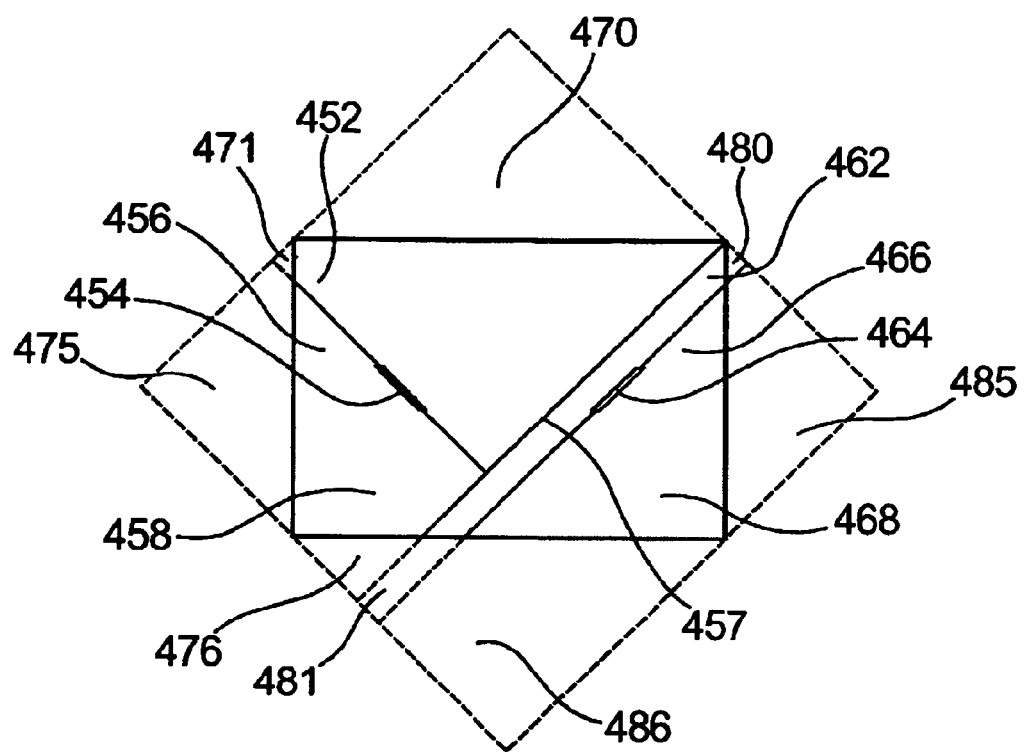
FIG. 12 is a schematic illustration of a construction technique utilizing one of the substrates as a reference block for making a head module with a vee arrangement between read and write elements.

In FIG. 12, an exemplary arrangement is illustrated for forming head modules, such as those shown at 304, 306, 404, and 406 and described above. In FIG. 12, for example, a head module 450 is shown. The head module 450, as shown, includes a read array 464 and a write array 454. Preferably, the thin film write array structure 454 is deposited on a relatively thick substrate block 452 along with any other gapline defining material and a thick closure piece 456 is bonded to the thin film structure 452 forming block 453. This combined structure is then preferably machined and lapped to form smooth continuous surface 457. A thin film read array structure 464 can be deposited on a substrate 462 and a relatively thick closure piece 466 can then be bonded to the thin film read structure 464 (including any other gapline defining material). Then, the other side of the substrate 462 can be bonded to the machined surface 457. The result is a thick block of minimal components providing substrates and closures for the pair of arrays arranged perpendicular to one another for use in large azimuth data recording of the present invention, in particular for use with forty five degree azimuthal recording. A post assembly process can also be performed to form a rectangular head by machining off portions 470 and 471 of substrate 452, portions 475, 476 of closure piece 456, and portions 480 and 481 of substrate 462, and portions 485 and 486 of closure piece 466. For other shapes, any type of post processing is contemplated.

The present invention is described above with reference to certain specific embodiments. The foregoing detailed description has been given for clarity of understanding. Others may recognize that changes can be made in the described embodiments without departing from the scope and spirit of the invention. Thus, the scope of the present invention should not be limited to the exact details and structures described herein.

What is claimed is:

1. A method of recording data in magnetic tape, the method comprising the steps of:
   moving a magnetic tape and a write element relative to one another for defining first and second recording directions;
   writing a first data track in the first recording direction during said movement and creating domains of opposite magnetization and a plurality of first spaced data transitions between the domains that are oriented at an azimuth angle of greater than twenty five degrees to a line that is perpendicular to the first recording direction so that the magnetized domains between the plurality of first data transitions together define the first data track; and
   writing a second data track adjacent to the first data track and in the second recording direction during said movement by creating domains of opposite magnetization and a plurality of spaced second data transitions between the domains that are oriented at a reverse azimuth angle greater than twenty five degrees to a line perpendicular to the second recording direction so that the magnetized domains between the plurality of second data transitions together define the second data track;
   whereby the adjacent first and second tracks are written with an included angle between the first data transitions and the second data transitions of greater than fifty degrees.

2. The method of claim 1, wherein the steps of writing the first and second data tracks comprises creating the first and second data transitions at forward and reverse azimuth angles with respect to a line perpendicular to the recording directions, respectively, at between forty and fifty degrees.

3. The method of claim 2, wherein the steps of writing the first and second data tracks comprises creating the first and second data transitions at forward and reverse azimuth angles with respect to a line perpendicular to the recording directions, respectively, at approximately forty five degrees.

4. The method of claim 1, further comprising a step of writing at least one additional data track in the first recording direction in a similar manner as the first data track by creating magnetized domains between a plurality of data transitions at an azimuth angle to the recording direction so that the magnetized domains and the plurality of data transitions together define the at least one additional data track.

5. The method of claim 4, further comprising a step of writing at least one additional data track in the second recording direction in a similar manner as the second data track by creating magnetized domains between a plurality of data transitions at an azimuth angle to the recording direction so that the magnetized domains and the plurality of data transitions together define the at least one additional data track.

6. The method of claim 1, wherein the first and second data tracks have a track width that is less than twenty microns.

7. The method of claim 1, wherein the step of moving the magnetic tape and write element relative to one another comprises moving the magnetic tape in a linear direction so that the first and second recording directions are parallel to one another and to the direction of tape movement.

8. The method of claim 1, the step of moving the magnetic tape and write element relative to one another comprises moving the magnetic tape in a linear direction and moving the write element at an angle to the linear direction of tape movement so that the first and second recording directions are generally parallel to one another but at an angle to the direction of tape movement.

9. The method of claim 1, wherein the first and second data tracks are written adjacent to one another without a separation zone between tracks.

10. A method of reading data that has been recorded on a magnetic tape, the method comprising the steps of:
    providing a magnetic tape having at least first and second adjacent data tracks, the first data track provided along a first data track direction with domains of opposite magnetization and a plurality of first spaced data transitions between the domains that are oriented at an azimuth angle of greater than twenty five degrees to a line that is perpendicular to the first data track direction, and the second data track provided along a second data track direction with domains of opposite magnetization and a plurality of second space data transitions that are oriented at a reverse azimuth angle of greater than twenty five degrees to a line that is perpendicular to the second data track direction; and
    moving the magnetic tape and a read element relative to one another along one of the first and second data track directions and thereby reading data from the magnetic tape.

11. The method of claim 10, wherein the read element is similarly oriented at the azimuth angle of the first data track for reading the first data transitions of the first data track.

12. The method of claim 10, wherein a read element is similarly oriented during a first reading step at the azimuth angle of the first data track for reading the first data transitions of the first data track and the read element is reoriented to be similarly oriented during a second reading step at the reverse azimuth angle of the second data track for reading the second data transitions of the second data track.

13. The method of claim 10, wherein a first read element is similarly oriented during a first reading step at the azimuth angle of the first data track for reading the first data transitions of the first data track and a second read element is similarly oriented during a second reading step at the reverse azimuth angle of the second data track for reading the second data transitions of the second data track.

14. The method of claim 10, wherein the step of providing the magnetic tape comprises providing a magnetic tape with first and second data tracks with the azimuth angle of the first data track at between forty and fifty degrees to a line perpendicular to the first data track direction, and with the reverse azimuth angle of the second data track at between forty and fifty degrees to a line perpendicular to the second data track direction.

15. The method of claim 10, wherein the step of providing the magnetic tape comprises providing a magnetic tape with first and second data tracks with the azimuth angle of the first data track at approximately forty five degrees to a line perpendicular to the first data track direction, and with the reverse azimuth angle of the second data track at approximately forty five degrees to a line perpendicular to the second data track direction.

16. The method of claim 10, wherein during a first reading step of the first data track, adjacent track signal from the second data track is sufficiently suppressed for effective reading of data of the first data track.

17. The method of claim 16, wherein the read element is provided as being of a greater width than the width of the first data track when oriented similarly so as to overlap the second data track as positioned in such orientation.

18. The method of claim 10, wherein the step of moving the magnetic tape and read element relative to one another comprises moving the magnetic tape in a linear direction so that the first and second data tracks can be read parallel to the direction of tape movement.

19. The method of claim 10, the step of moving the magnetic tape and read element relative to one another comprises moving the magnetic tape in a linear direction and moving the read element at an angle to the linear direction of tape movement so that the first and second data tracks can be read at an angle to the direction of tape movement.

20. A magnetic tape having a first data track provided thereon and extending in a first data track direction along the magnetic tape and a second data track provided thereon and extending in a second data track direction along the magnetic tape, the first and second data tracks being parallel and adjacent to one another, wherein the first data track comprises domains of opposite magnetization and a plurality of first spaced data transitions between the domains that are oriented at an azimuth angle of greater than twenty five degrees to a line that is perpendicular to the first data track direction and the second data track comprises domains of opposite magnetization and a plurality of second spaced data transitions between the domains that are oriented at a reverse azimuth angle of greater than twenty five degrees to a line that is perpendicular to the second data track direction, wherein an included angle between the first and second data transition is greater than fifty degrees.

21. The magnetic tape of claim 20, wherein the first data track has the azimuth angle of its first data transitions at between forty and fifty degrees to a line perpendicular to the first data track direction, and the second data track has the reverse azimuth angle of its second data transitions at between forty and fifty degrees to a line perpendicular to the second data track direction.

22. The magnetic tape of claim 21, wherein the first data track has the azimuth angle of its first data transitions at approximately forty five degrees to a line perpendicular to the first data track direction, and the second data track has the reverse azimuth angle of its second data transitions at approximately forty five degrees to a line perpendicular to the second data track direction.

23. The magnetic tape of claim 20, wherein the first and second tracks have similar track widths that are less than twenty microns.

24. The magnetic tape of claim 20, further comprising a plurality of tracks recorded in the manner of the first track and a plurality of tracks recorded in the manner of the second track.

25. A magnetic tape data transfer system employing read and write elements for positioning relative to a magnetic tape and to permit relative movement between the elements and the magnetic tape, the system comprising:
   a head module having a tape facing surface provided to accommodate movement of a magnetic tape relative to the head module in a data transfer direction;
   a first thin film data transfer element including a first gapline operatively provided along the tape facing surface, the gapline of the first element oriented at a first azimuth angle of greater than twenty five degrees with respect to the data transfer direction; and
   a second thins film data transfer element including a second gapline provided along the tape facing surface, the gapline of the second element oriented at a reverse azimuth angle of greater than twenty five degrees with respect to the first azimuth angle and to the data transfer direction, wherein an included angle between the first azimuth angle and the reverse azimuth angle is greater than fifty degrees as both the first and second data transfer elements are presented on the tape facing surface of the head module.

26. The magnetic tape data transfer system of claim 25, wherein the azimuth angle of the first element and the reverse azimuth angle of the second element are between forty and fifty degrees with respect to the data transfer direction.

27. The magnetic tape data transfer system of claim 26, wherein the azimuth angle of the first element and the reverse azimuth angle of the second element are approximately forty five degrees with respect to the data transfer direction so that the first and second elements are oriented at approximately ninety degrees from one another.

* * * * *

UNITED STATES PATENT AND TRADEMARK OFFICE
CERTIFICATE OF CORRECTION

PATENT NO. : 6,947,247 B2 Page 1 of 1
DATED : September 20, 2005
INVENTOR(S) : Theodore A. Schwarz and Matthew P. Dugas It is certified that error appears in the above-identified patent and that said Letters Patent is hereby corrected as shown below:

Column 22,
Line 41, delete "presented" and insert -- present --.

Signed and Sealed this

Ninth Day of May, 2006

JON W. DUDAS
*Director of the United States Patent and Trademark Office*